United States Patent
Fujihara et al.

(10) Patent No.: US 11,351,467 B2
(45) Date of Patent: Jun. 7, 2022

(54) INFORMATION PROCESSING APPARATUS AND GAME IMAGE DISTRIBUTING METHOD

(71) Applicant: SONY INTERACTIVE ENTERTAINMENT INC., Tokyo (JP)

(72) Inventors: Masahiro Fujihara, Tokyo (JP); Kiyobumi Matsunaga, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 49 days.

(21) Appl. No.: 16/761,888

(22) PCT Filed: Nov. 22, 2018

(86) PCT No.: PCT/JP2018/043194
§ 371 (c)(1),
(2) Date: May 6, 2020

(87) PCT Pub. No.: WO2019/107274
PCT Pub. Date: Jun. 6, 2019

(65) Prior Publication Data
US 2020/0306650 A1    Oct. 1, 2020

(30) Foreign Application Priority Data
Dec. 1, 2017  (JP) .............................. JP2017-232107

(51) Int. Cl.
*A63F 13/34*     (2014.01)
*A63F 13/40*     (2014.01)
(Continued)

(52) U.S. Cl.
CPC .............. *A63F 13/86* (2014.09); *A63F 13/34* (2014.09); *A63F 13/798* (2014.09);
(Continued)

(58) Field of Classification Search
CPC .......... A63F 13/34; A63F 13/35; A63F 13/79; A63F 13/95; A63F 13/847; A63F 13/86; A63F 13/87
See application file for complete search history.

(56) References Cited

U.S. PATENT DOCUMENTS 10,668,373 B2 *   6/2020  Nomura ................. G06F 13/00
2011/0263333 A1 * 10/2011  Dokei ................... A63F 13/795
                                                               463/42
(Continued)

FOREIGN PATENT DOCUMENTS

EP      3034141 A1     6/2016
JP      2008-194314 A  8/2008
(Continued)

OTHER PUBLICATIONS

The extended European search report dated Jun. 29, 2021, from EP Application No. 18884614.1, 9 sheets.
(Continued)

*Primary Examiner* — Lawrence S Galka
(74) *Attorney, Agent, or Firm* — Katten Muchin Rosenman LLP

(57) ABSTRACT

An image processing unit 118 generates a distribution image including a game image. A distribution processing unit 126 distributes the distribution image to one or more of information processing terminals through a shared server. A participation processing unit 128 accepts play requests of viewing users operating the information processing terminals and approves a game play of one of the viewing users who has made a request for a play. An application execution unit 110 processes a game using operation information transmitted from the information processing terminal operated by the viewing user the game play of which has been approved.

9 Claims, 12 Drawing Sheets

(51) Int. Cl.
*A63F 13/79* (2014.01)
*A63F 13/87* (2014.01)
*A63F 13/86* (2014.01)
*A63F 13/798* (2014.01)
*H04L 67/104* (2022.01)
*H04L 67/131* (2022.01)
*A63F 13/812* (2014.01)

(52) U.S. Cl.
CPC ........ *H04L 67/1046* (2013.01); *H04L 67/131* (2022.05); *A63F 13/812* (2014.09); *A63F 13/87* (2014.09); *A63F 2300/408* (2013.01); *A63F 2300/537* (2013.01); *A63F 2300/558* (2013.01); *A63F 2300/8011* (2013.01)

(56) References Cited

U.S. PATENT DOCUMENTS

| | | | |
|---|---|---|---|
| 2013/0130794 | A1 | 5/2013 | Oshima et al. |
| 2015/0281296 | A1* | 10/2015 | Takaichi ................. A63F 13/86 709/231 |
| 2016/0151707 | A1* | 6/2016 | Takaichi ................. A63F 13/25 463/30 |
| 2017/0001112 | A1 | 1/2017 | Gilmore et al. |
| 2017/0209790 | A1* | 7/2017 | Nomura ................. A63F 13/79 |
| 2017/0225082 | A1 | 8/2017 | Suwa et al. |

FOREIGN PATENT DOCUMENTS

| | | |
|---|---|---|
| JP | 2011182818 A | 9/2011 |
| JP | 2011-224204 A | 11/2011 |
| JP | 2012-34793 A | 2/2012 |
| JP | 2015-36033 A | 2/2015 |
| JP | 2016-46538 A | 4/2016 |
| JP | 6015871 B1 | 10/2016 |
| JP | 2017-35298 A | 2/2017 |
| KR | 10-2004-0005068 A | 1/2004 |
| WO | 2013/111247 A1 | 8/2013 |
| WO | 2014/068806 A1 | 5/2014 |
| WO | 2016176362 A1 | 11/2016 |

OTHER PUBLICATIONS

International Preliminary Report on Patentability dated Jun. 2, 2020, from International Application No. PCT/JP2018/043194, 16 sheets.

International Search Report and Written Opinion dated Feb. 12, 2019, from International Application No. PCT/JP2018/043194, 10 sheets.

Notice of Reasons for Refusal dated Mar. 29, 2022, from Japanese Application No. 2021-020629, 5 sheets.

* cited by examiner

INFORMATION PROCESSING APPARATUS AND GAME IMAGE DISTRIBUTING METHOD

TECHNICAL FIELD

The present invention relates to a technique of distributing a game image.

BACKGROUND ART

In recent years, a broadcasting service in which a user performs broadcast distribution of a game image being played by the user to a plurality of viewing users through a sharing site has become popular. PTL 1 discloses a sharing process in which a live distribution image including a game image being played is broadcasted to the viewing users. The live distribution image disclosed in PTL 1 includes a display region of a captured image of a playing user, a comment display region in which comments from the viewing users are sequentially displayed, and a participation button for participating in a game of the distribution user, for example. When the viewing user operates the participation button, the game is started up, so that the viewing user can participate in the game of the distribution user.

CITATION LIST

Patent Literature

[PTL 1] WO 2014/068806

SUMMARY

Technical Problems

In the sharing process disclosed in PTL 1, a scheme in which the viewing user having the same game as that owned by the distribution user participates in the game and plays with the distribution user is achieved. However, if the viewing user does not have the game, the viewing user cannot participate in the game. Also, in a case in which the game image is broadcasted through the sharing site, a message including a personal information or privacy information is displayed on the game image, causing a problem that the message is also made public to the viewing user.

In view of this, the present invention has an object to provide a technique for enhancing usability of a sharing system of distributing a game image to a viewing user.

Solution to Problems

To solve the above-mentioned problems, an information processing apparatus according a mode of the present invention includes: an image processing unit configured to generate a distribution image including a game image; a distribution processing unit configured to distribute the distribution image to one or more of information processing terminals through a shared server; a participation processing unit configured to accept play requests of viewing users operating the information processing terminals and to approve a game play of one of the viewing users who has made the request for a play; and an application execution unit configured to process a game using operation information transmitted from the information processing terminal operated by the viewing user the game play of which has been approved.

A game image distribution method according another mode of the present invention includes: a step of generating a distribution image including a game image; a step of distributing the distribution image to one or more of information processing terminals through a shared server; a step of accepting play requests of viewing users operating the information processing terminals; a step of approving a game play of one of the viewing users who has made a request for a play; and a step of processing a game using operation information transmitted from the information processing terminal operated by the viewing user the game play of which has been approved.

Noted that an arbitrary combination of the above components and conversions of the expressions of the present invention between a method, an apparatus, a system, a recording medium, a computer program, and the like are also effective as modes of the present invention.

DESCRIPTION OF EMBODIMENT

Figure 1:
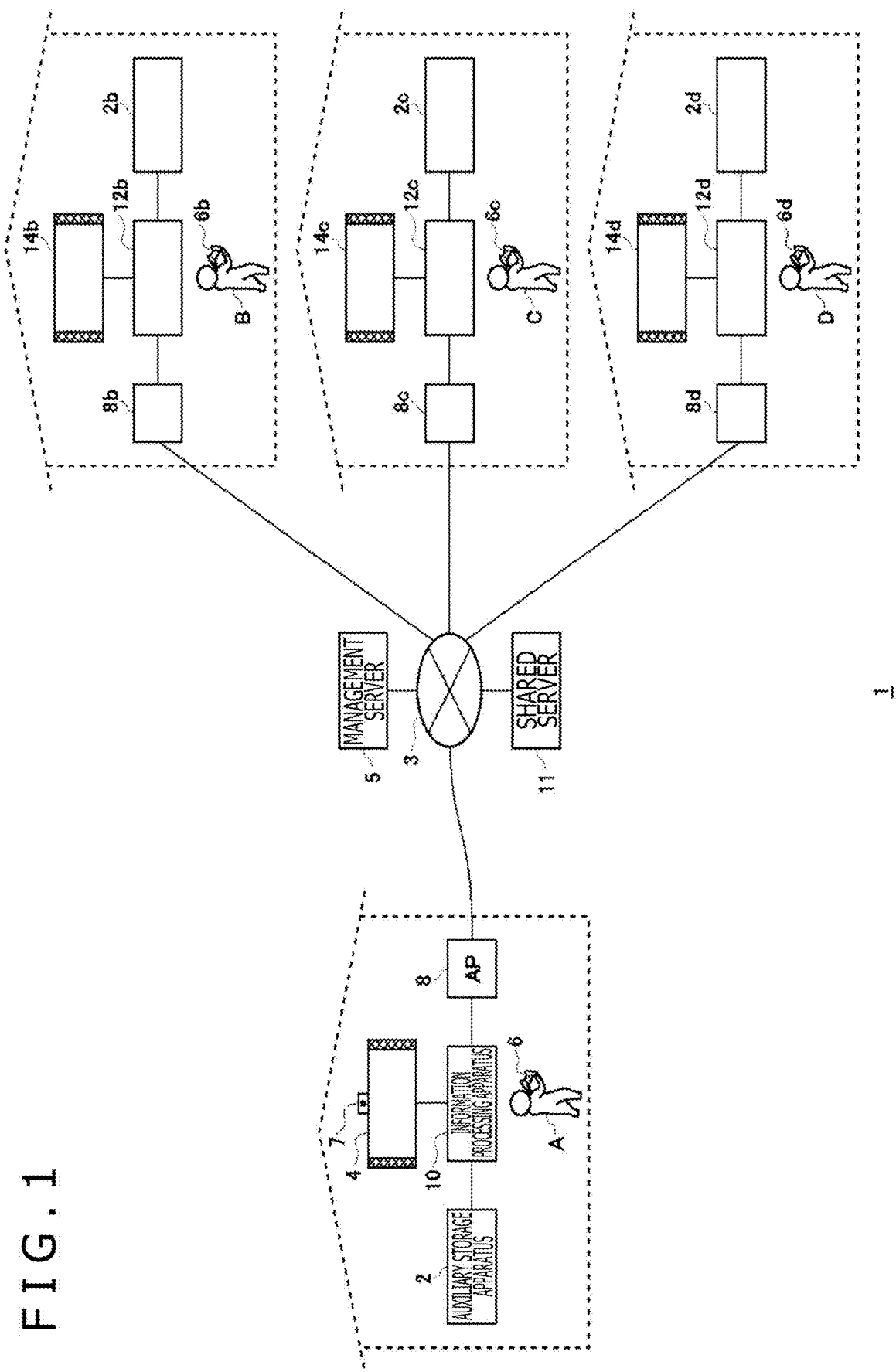
FIG. 1 is a diagram depicting an image sharing system according to an embodiment of the present invention.

FIG. 1 is a diagram depicting an image sharing system 1 according to an embodiment of the present invention. The image sharing system 1 realizes an environment in which a user A as a distributor performs live distribution of a game image and sound during play and other viewing users B, C, and D views the game image and sound. In this embodiment, streaming distribution of a game image is particularly described. However, note that a game sound is also streaming distributed along with the game image simultaneously. Note that the viewing users B, C, and D are merely examples and not limited to three. Also, the viewing users are not limited to users who have registered as a friend of the distribution user A in the image sharing system 1 and may be unspecified users who can access a management server 5 and a shared server 11.

The image sharing system 1 includes an information processing apparatus 10 operated by the distribution user A, information processing terminals 12b, 12c, and 12d operated by the respective viewing users B, C, and D (hereinafter referred to as an "information processing terminal 12" when not particularly distinguished from each other), the management server 5, and the shared server 11, and they are connected to one another through a network 3 such as the Internet. Note that, since a configuration of the periphery of the information processing terminal 12 of each of the viewing users is the same as a configuration of the periphery of the information processing apparatus 10 of the distribution user A, the configuration of the periphery of the information processing apparatus 10 of the distribution user A will be described below as a representative.

An access point (hereinafter referred to as "AP") 8 has functions of a wireless access point and a router, and the information processing apparatus 10 connects to the AP 8 in a wireless or a wired manner so as to communicatably connect to the management server 5, the shared server 11, and the information processing terminal 12 on the network 3.

The information processing apparatus 10 establishes connection to an input apparatus 6, which is operated by a user, in a wireless or a wired manner, and the input apparatus 6 outputs operation information by the user to the information processing apparatus 10. When receiving operation information from the input apparatus 6, the information processing apparatus 10 reflects the operation information on processing of system software or application software, and causes an output apparatus 4 to output a result of the processing. In the embodiment, the application software may be a game software, the information processing apparatus 10 may be a game apparatus which executes a game software, and the input apparatus 6 may be a device which supplies operation information of the user to the information processing apparatus 10, such as a game controller. The input apparatus 6 serving as a game controller includes a plurality of input sections such as a plurality of push-type operation buttons, an analog stick capable of inputting an analog quantity, a rotary button, and the like. As described below, the input apparatus 6 includes at least an operation button called "SHARE button" for displaying a screen related to a sharing process, and an operation button called "HOME button" for displaying a predetermined system screen.

The auxiliary storage apparatus 2 is a large capacity storage apparatus such as an HDD (Hard Disk Drive) or a flash memory and may be an external storage apparatus connected to the information processing apparatus 10 by a USB (Universal Serial Bus) or may be a built-in type storage apparatus. The output apparatus 4 may be a television set having a display which outputs an image and a speaker which outputs sound. The output apparatus 4 may be connected to the information processing apparatus 10 by a wire cable or by wireless connection.

A camera 7 which is a stereo camera captures a space around the output apparatus 4. In the embodiment, the camera 7 is used to capture an image of the user A to be included in a distribution image. FIG. 1 depicts an example in which the camera 7 is attached to an upper portion of the output apparatus 4. However, the camera 7 may be disposed on a side of the output apparatus 4. In either case, the camera 7 is disposed in such a position as to be able to capture the user A playing the game in front of the output apparatus 4.

The information processing apparatus 10 performs streaming distribution of a game image during play to the shared server 11 to broadcast the game image to the information processing terminal 12 which accesses the shared server 11. Thus, the image sharing system 1 in the embodiment works as a game image distribution system. The information processing terminal 12 may be the same apparatus as the information processing apparatus 10.

The management server 5 provides a network service to the user of the information processing apparatus 10 and to the user of the information processing terminal 12 and manages the network service. The management server 5 manages network accounts for identifying the users, and a user uses its network account to sign in to the network service. By signing in to the network service, the user can register save data of a game or a virtual award article (trophy) acquired during a game play into the management server 5. In addition, the user can perform streaming distribution of a game image and sound to the shared server 11. Also, the user accesses the shared server 11 and can view a game image and sound through the shared server 11.

In the embodiment, the user A plays a game by operating the input apparatus 6, and a game image during play (hereinafter also referred to as a "play image") is displayed on the output apparatus 4. At this time, the play image is also distributed to the information processing terminals 12b, 12c, and 12d of the respective viewing users through the shared server 11 from the information processing apparatus 10, so that the play image is displayed on each of output apparatuses 14b, 14c, and 14d (hereinafter referred to as an "output apparatus 14" when not particularly distinguished from each other). Note that a resolution of the play image to be distributed is set lower than a resolution of a play image to be displayed on the output apparatus 4.

Figure 2:
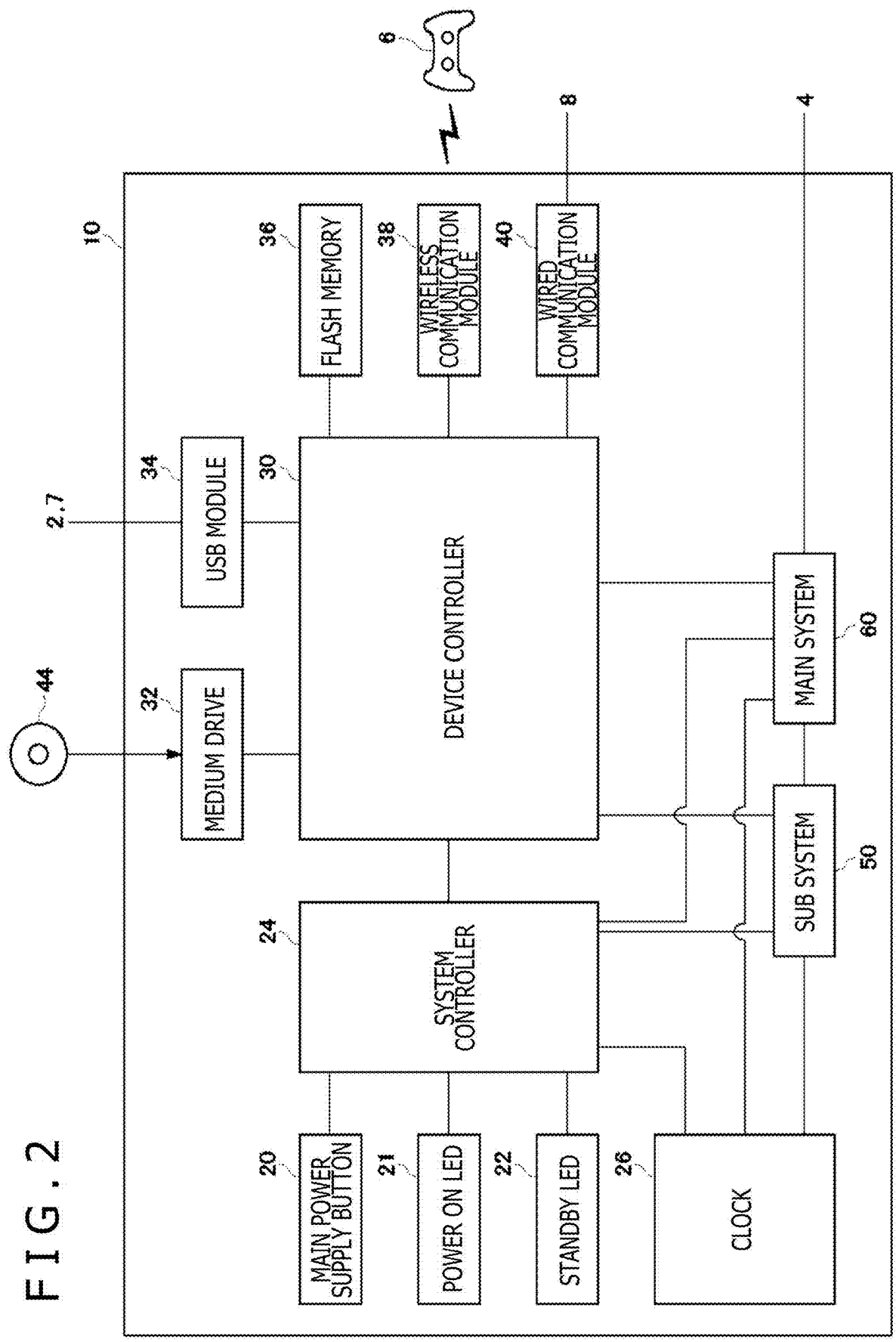
FIG. 2 is a diagram depicting functional blocks of an information processing apparatus.

FIG. 2 is a diagram depicting functional blocks of the information processing apparatus 10. Note that, since the information processing terminal 12 is the same game apparatus as the information processing apparatus 10, the information processing terminal 12 includes the functional blocks depicted in FIG. 2 as well. The information processing apparatus 10 includes a main power supply button 20, a power ON LED (Light Emitting Diode) 21, a standby LED 22, a system controller 24, a clock 26, a device controller 30, a medium drive 32, a USB module 34, a flash memory 36, a wireless communication module 38, a wired communication module 40, a sub system 50, and a main system 60.

The main system 60 includes a main CPU (Central Processing Unit), a memory as a main storage apparatus, a memory controller, a GPU (Graphics Processing Unit), and the like. The GPU is used mainly for arithmetic processing of a game program. These functions may be configured as a system-on-chip and formed on one chip.

The main CPU has a function of executing a game program recorded in the auxiliary storage apparatus 2 or a ROM (Read-Only Memory) medium 44.

The subsystem 50 includes a sub-CPU, a memory as a main storage apparatus, a memory controller, and the like. The subsystem 50 does not include a GPU. Further, the subsystem 50 does not have a function of executing a game program. The number of circuit gates of the sub CPU is smaller than the number of circuit gates of the main CPU, and the operation power consumption of the sub CPU is lower than that of the main CPU. The sub CPU operates while the main CPU is in a standby state, and the processing functions of the sub CPU are limited in order to suppress the power consumption of the sub CPU low.

The main power supply button 20 is an input unit to which an operation input from the user is carried out and is provided on a front face of a housing of the information processing apparatus 10 so as to be operated in order to turn on or off the power supply to the main system 60 of the information processing apparatus 10. The power ON LED 21 is lit when the main power supply button 20 is turned on, and the standby LED 22 is lit when the main power supply button 20 is turned off.

The system controller 24 detects depression of the main power supply button 20 by the user. When the main power supply button 20 is depressed while the main power supply is in an off state, then the system controller 24 acquires the depression operation as an "on instruction." Conversely, the main power supply button 20 is depressed while the main power supply is in an on state, the system controller 24 then acquires the depression operation as an "off instruction."

The clock 26 is a real time clock, and generates date and time information at present and supplies the generated information to the system controller 24, the sub system 50, and the main system 60. The device controller 30 is configured as a LSI (Large-Scale Integrated Circuit) which executes delivery of information between devices like a south bridge. As depicted in FIG. 2, such devices as the system controller 24, the medium drive 32, the USB module 34, the flash memory 36, the wireless communication module 38, the wired communication module 40, the sub system 50 and the main system 60 are connected to the device controller 30. The device controller 30 absorbs a difference in electric characteristic and a difference in data transfer rate between the devices and controls a timing of data transfer.

The medium drive 32 is a drive apparatus which drives the ROM medium 44 on which application software of a game or the like and license information is recorded with the ROM medium 44 loaded thereon to read out a program, data, and so forth from the ROM medium 44. The ROM medium 44 may be a read-only recording medium such as an optical disc, a magneto-optical disc, or a Blu-ray disc.

The USB module 34 is a module to be connected to an external device by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the input apparatus 6 using a communication protocol such as a Bluetooth (registered trademark) protocol or IEEE (Institute of Electrical and Electronic Engineers) 802.11 protocol. The wired communication module 40 communicates with an external device in a wired manner and is connected to the network 3 through the AP 8.

Figure 3:
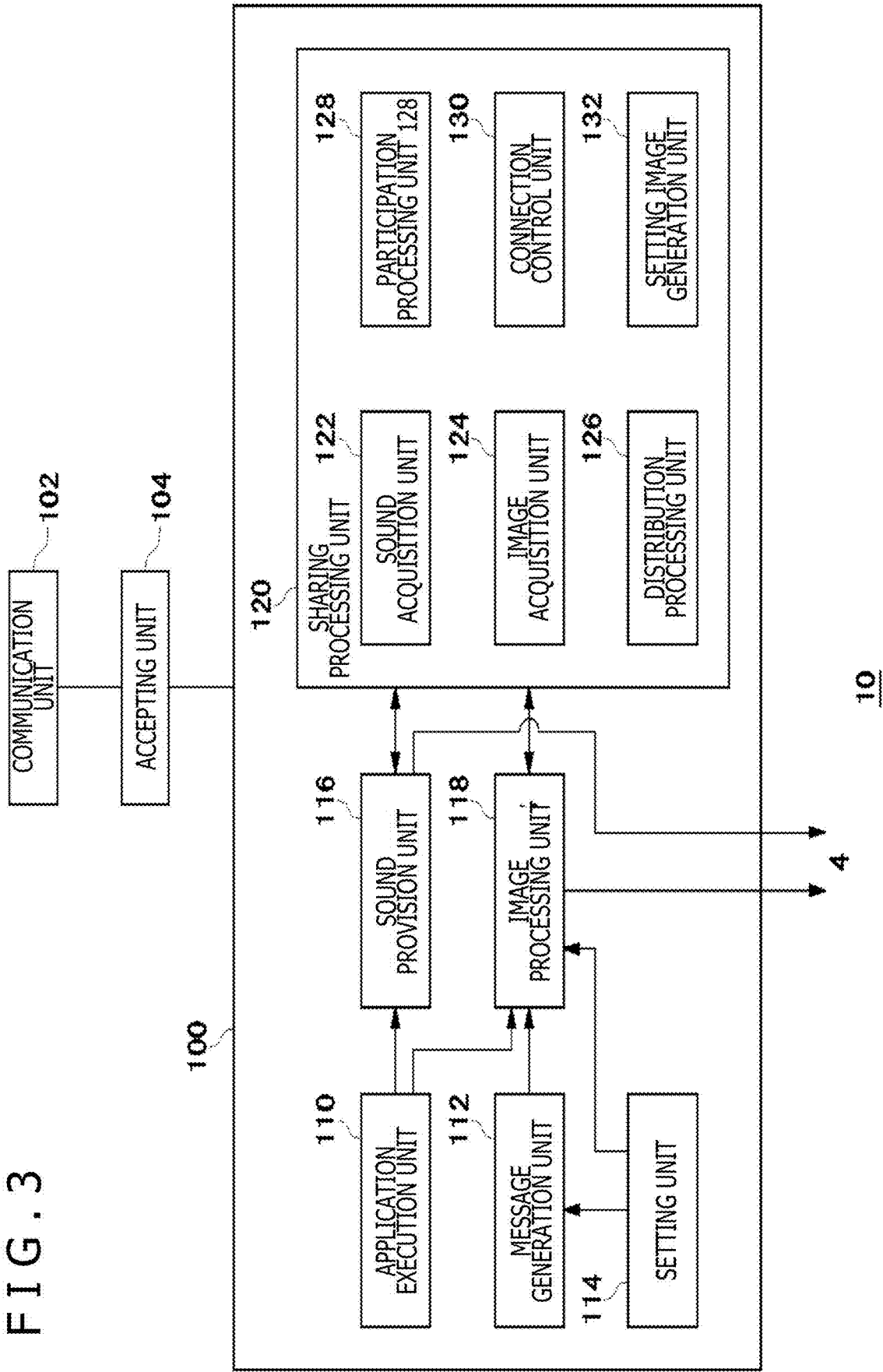
FIG. 3 is a diagram depicting a configuration of the information processing apparatus.

FIG. 3 depicts a configuration of the information processing apparatus 10 which operates as a distribution apparatus for streaming data. The information processing apparatus 10 includes a processing unit 100, a communication unit 102 and a accepting unit 104. The processing unit 100 includes an application execution unit 110, a message generation unit 112, a setting unit 114, a sound provision unit 116, an image processing unit 118, and a sharing processing unit 120. The sharing processing unit 120 includes a sound acquisition unit 122, an image acquisition unit 124, a distribution processing unit 126, a participation processing unit 128, a connection control unit 130, and a setting image generation unit 132.

In FIG. 3, elements indicated as functional blocks for performing various processing operations can be configured by hardware such as a circuit block, a memory, or another LSI or implemented by software such as a system software or a game program loaded into the memory. Thus, it will be understood by those skilled in the art that these functional blocks may be variously implemented by hardware only, by software only, or by a combination of hardware and software. The functional blocks are not limited to any of these.

The application execution unit 110 executes a game software (hereinafter referred to simply as a "game" in some cases) to generate image data and sound data of the game. The function provided by the application execution unit 110 is realized by the system software, the game software, the hardware such as the GPU, or the like. Note that the game is merely an example of an application, and the application execution unit 110 may execute an application other than a game.

While the user A is playing a game, the application execution unit 110 executes arithmetic processing to move a game character in a virtual space on the basis of the operation information that the user A inputs with the input apparatus 6. The application execution unit 110 includes a GPU which executes rendering processing or the like, and receives a result of the arithmetic processing in the virtual space to generate game image data from a viewpoint position (virtual camera) in the virtual space. Moreover, the application execution unit 110 generates game sound data in the virtual space.

In the information processing apparatus 10, the communication unit 102 receives operation information obtained as a result of operation of the user on the input section of the input apparatus 6 and transmits the image and sound data generated in the processing unit 100 to the shared server 11 and the information processing terminal 12. It is assumed that the communication unit 102 has the functions of the wireless communication module 38 and wired communication module 40 depicted in FIG. 2.

The accepting unit 104 is disposed between the communication unit 102 and the processing unit 100 and transmits data or information to and from the communication unit 102 and the processing unit 100. When accepting operation information of the input section provided in the input apparatus 6 through the communication unit 102, the accepting unit 104 supplies the accepted operation information to the application execution unit 110 and/or the sharing processing unit 120 of the processing unit 100.

Figure 4:
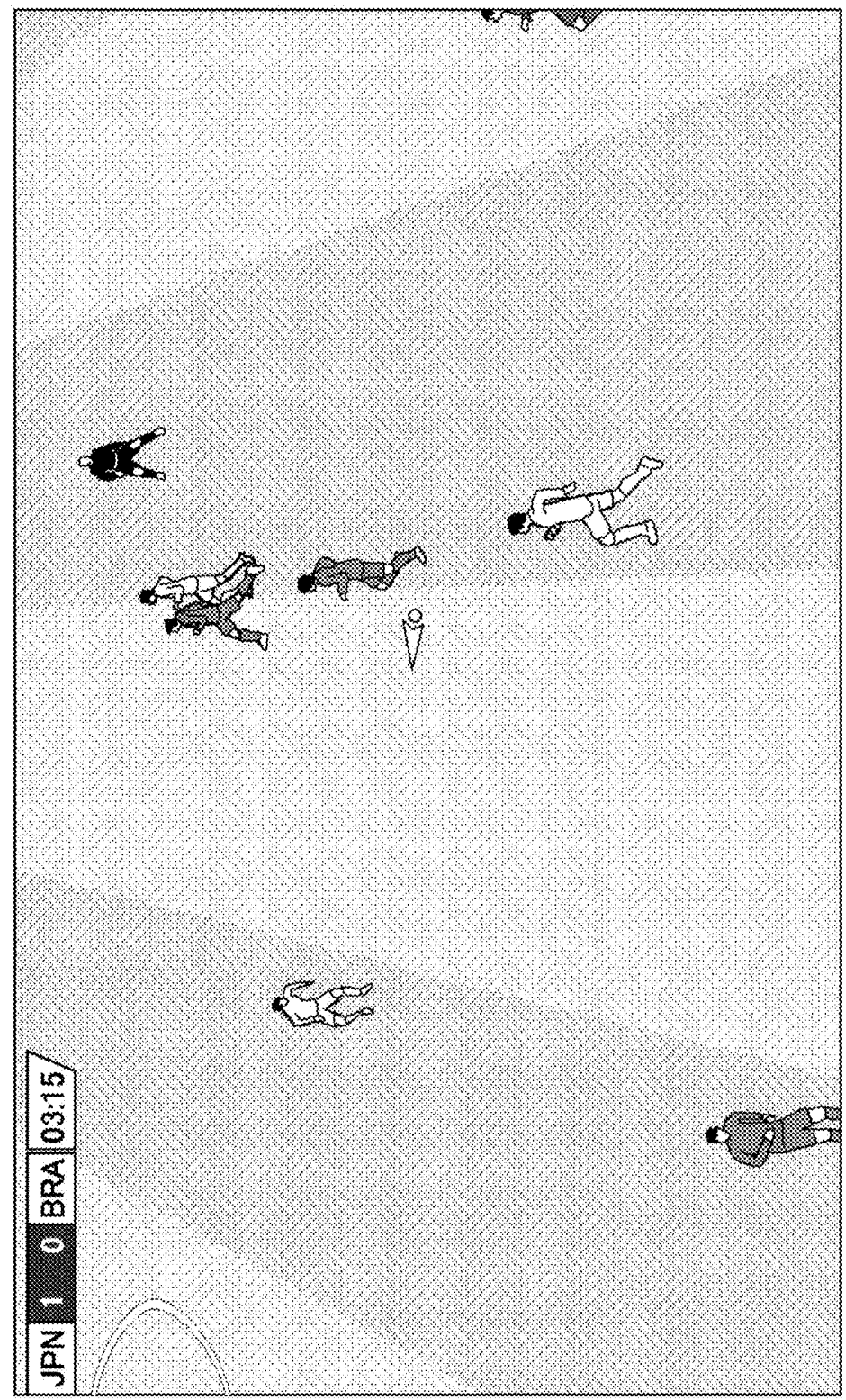
FIG. 4 is a diagram depicting an example of a game screen displayed on an output apparatus of a user.

FIG. 4 is a diagram depicting an example of a game screen displayed on the output apparatus 4 of the user A. Note that the game screen depicted in FIG. 4 is the game screen prior to streaming distribution. During a game play of the user A, the application execution unit 110 generates a play image and play sound, and the image processing unit 118 provides the play image to the output apparatus 4, while the sound provision unit 116 provides the play sound to the output apparatus 4. As a result, the play image and the play sound are output from the output apparatus 4.

Figure 5:
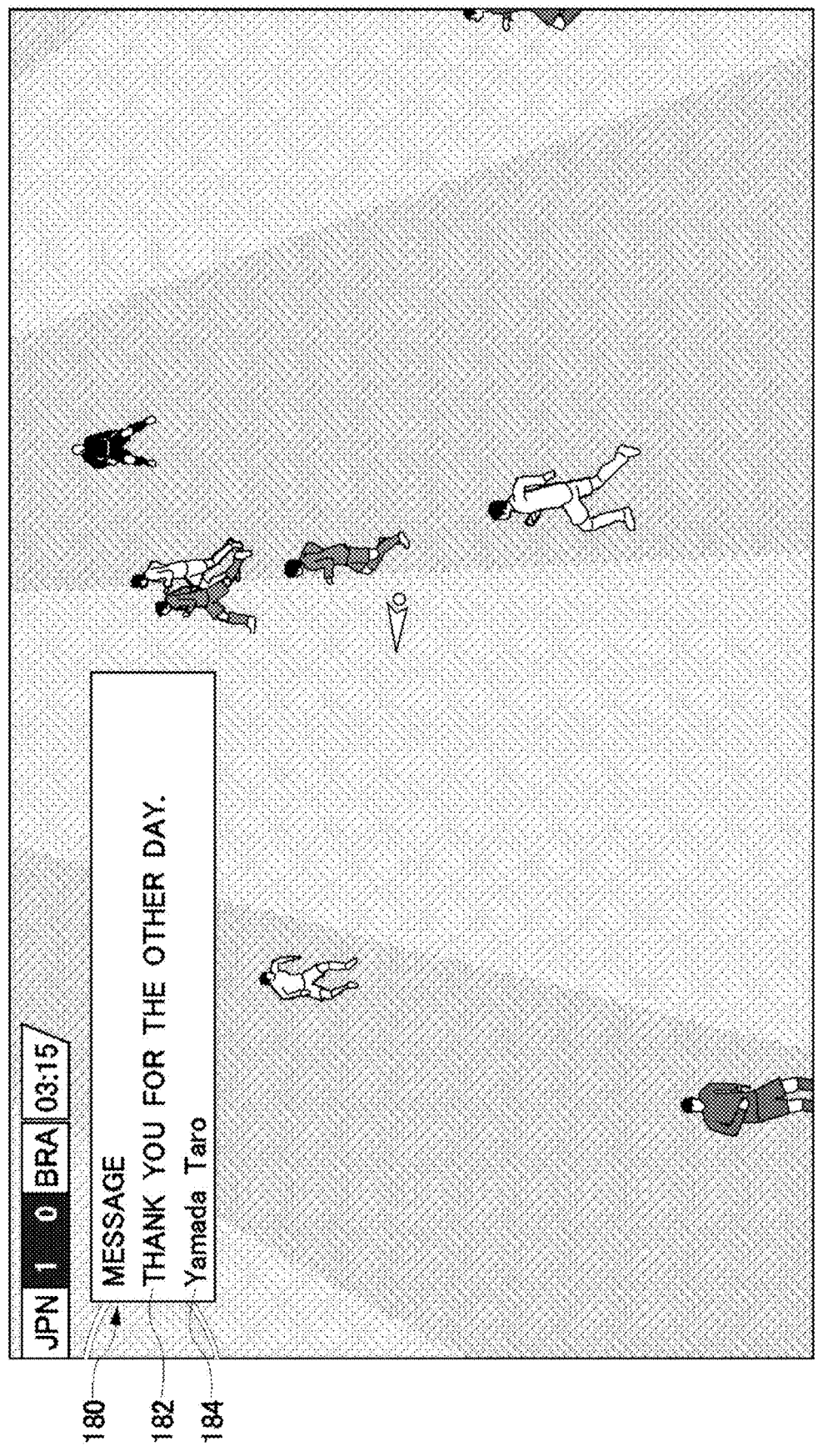
FIG. 5 is a diagram depicting an example of a pop-up window.

FIG. 5 is a diagram depicting an example of a pop-up window which is displayed in a superimposed manner on the game screen. The management server 5 registers friends of the user A. For example, when a friend is in an online state or a friend creates a message to the user A, the management server 5 transmits a state information regarding the friend or the message from the friend to the information processing apparatus 10. When the accepting unit 104 accepts the state information regarding the friend or the message from the friend, the message generation unit 112 generates the notification message for the user A and then provides the generated notification message to the image processing unit 118. The image processing unit 118 displays the generated notification message in a form of the pop-up window 180 in a superimposed manner on the upper left corner on the game screen.

A user name 184 identifying the user who has created the notification message is included in the pop-up window 180. For example, in a case where the management server 5 requests a real name registration as the user name, the real name which is a personal information is included in the pop-up window 180. The display of the real name in this case is to be viewed only by the user A who is the friend, and accordingly, there is no problem of disclosure of the personal information. The pop-up window 180 notifies the user A that the message from "Yamada Taro" who is the friend of the user A is received, and a text of the message 182 indicates part (first one sentence) of the message from "Yamada Taro."

Hereinafter, the sharing process in the embodiment will be described.

The sharing processing unit 120 performs a process for sharing image and sound data of the game being played by the user A with another user through the shared server 11. Users who access the shared server 11 are not limited to the friends of the user A, but include unspecified users who use the service of the shared server 11. The sharing process of the game image and sound date is started at a time when the user A operates a specified input section (SHARE button) provided in the input apparatus 6 as a trigger, and the sharing processing unit 120 generates an input image indicating options regarding sharing of the image and sound data.

Figure 6:
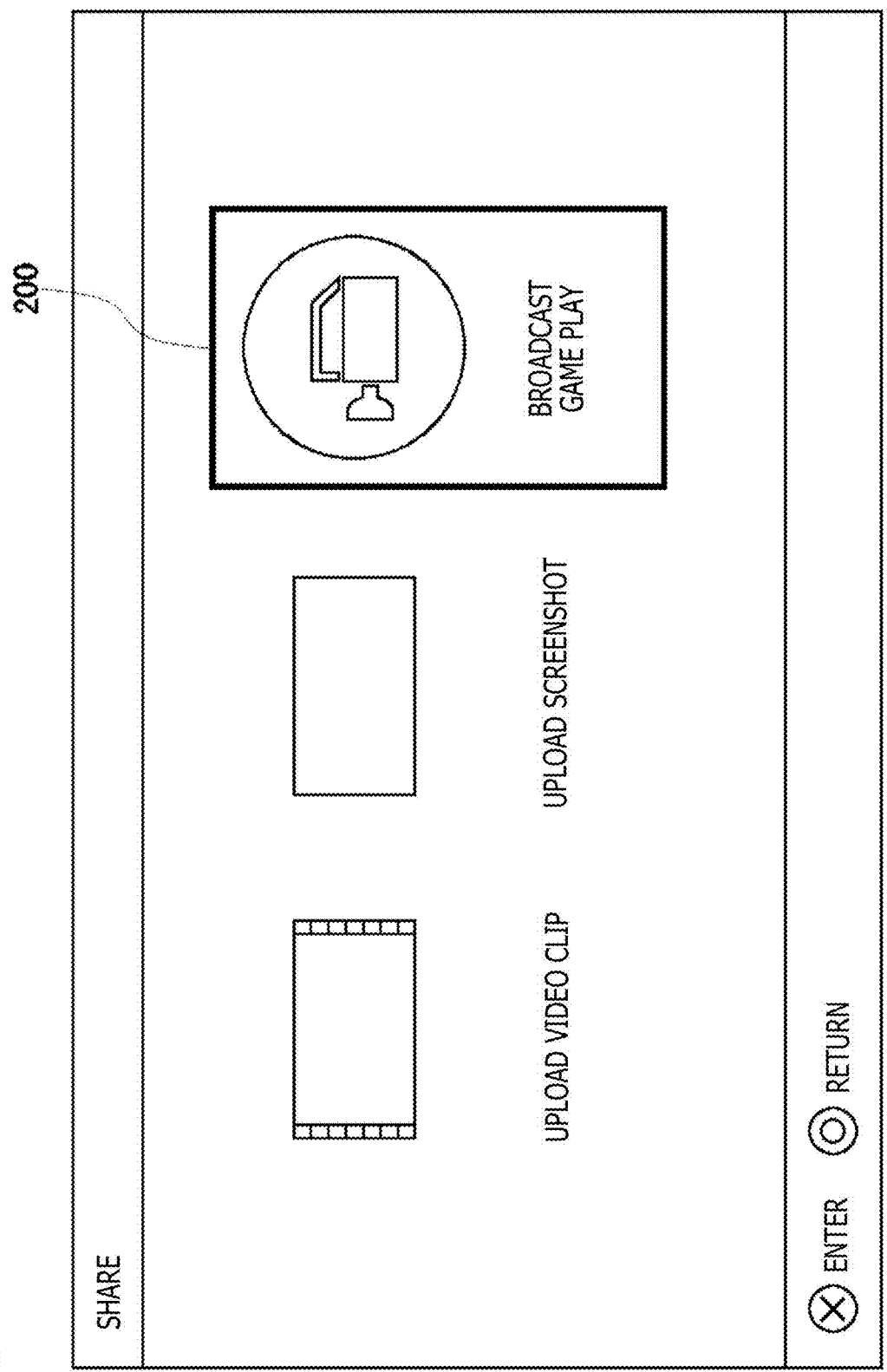
FIG. 6 is a diagram depicting an example of an input screen indicating options of a sharing process.

FIG. 6 depicts an example of an input screen indicating the options in the sharing process. The setting image generation unit 132 generates an input image indicating the options in the sharing process and causes the image processing unit 118 to display the generated input image on the output apparatus 4. On this input screen, three options regarding the sharing of the image and sound data are indicated. The option "UPLOAD VIDEO CLIP" is a GUI (Graphical User Interface) for designating that an image recorded in the auxiliary storage apparatus 2 is to be uploaded to the shared server 11. The option "UPLOAD SCREENSHOT" is a GUI for designating that an image of a screen shot is to be uploaded to the shared server 11. The option "BROADCAST GAME PLAY" is a GUI for designating that the image and sound data of the game is to be relayed in real time through the shared server 11. The user A operates the input apparatus 6 to move an optional frame 200, and then selects any one of the GUIs and presses ENTER button, thereby executing the sharing process selected.

In the embodiment, the GUI "BROADCASTS GAME PLAY" is assumed to be selected. Note that, after this GUI is selected, the setting image generation unit 132 displays a setting screen for selecting a resolution of the game image in broadcast distribution on the output apparatus 4 and the user selects the resolution of the distribution image, after which the broadcast distribution may be started. Note that the resolution to be selectable is assumed to be lower than the resolution of the game image to be displayed on the output apparatus 4.

Figure 7:
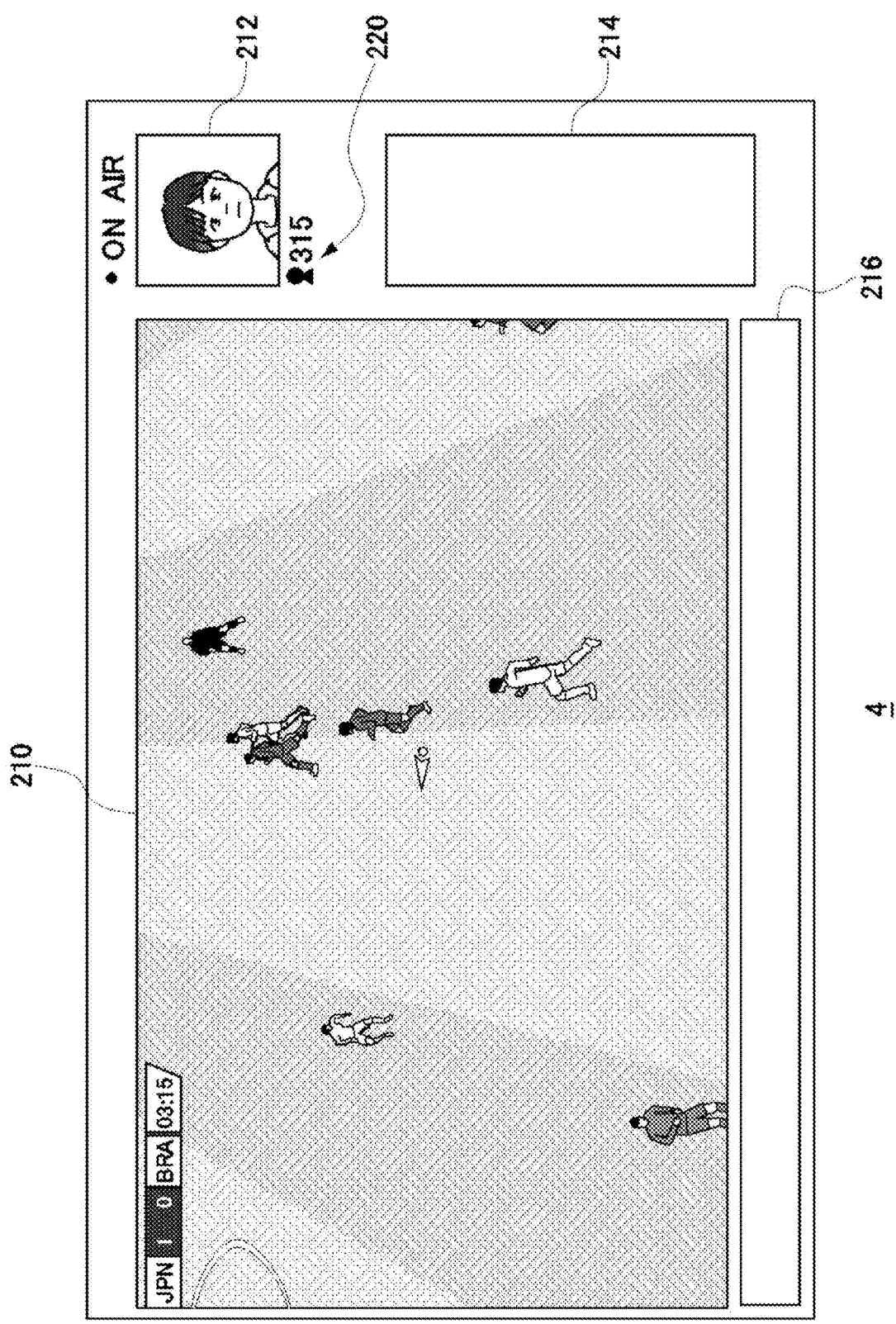
FIG. 7 is a diagram depicting an example of a screen to be displayed on the output apparatus of a distribution user.

FIG. 7 depicts an example of a screen to be displayed on the output apparatus 4 of the distribution user A. When streaming distribution is started, the image processing unit 118 generates a display image in accordance with a screen layout depicted in FIG. 7. In this screen layout, a play image which is generated in the application execution unit 110 is displayed in a play image display region 210. Note that, compared to a display region of the play image depicted in FIG. 4, the play image display region 210 is reduced in size, and accordingly, the image processing unit 118 downsizes the play image data to display the downsized play image data in the play image display region 210. A captured image which is captured by the camera 7 is displayed in a camera image display region 212, and a viewer number display region 220 is provided on a lower portion of the camera image display region 212. The number of viewers is provided from the management server 5 or the shared server 11. In this example, the number of viewers is counted as 315.

A comment from a viewing user is displayed in a comment display region 214. Note that the viewing user can input a comment from the information processing terminal 12, and the input comment is assumed to be transmitted to the information processing apparatus 10 through the shared server 11. A message input region 216 is a field in which the playing user A inputs a message for the viewing user. During streaming distribution, the image processing unit 118 generates a display image including a game image in the screen layout depicted in FIG. 7 and outputs the display image to the output apparatus 4 and the sharing processing unit 120. Note that, in a case where the playing user A gives permission, the sound provision unit 116 provides sound input to a microphone of the information processing apparatus 10 to the sharing processing unit 120 by superimposing the input sound on the game sound generated in the application execution unit 110.

The sound acquisition unit 122 acquires the sound provided from the sound provision unit 116, and the image acquisition unit 124 acquires the image provided from the image processing unit 118. The sound acquired by the sound acquisition unit 122 and the image acquired by the image acquisition unit 124 are distribution sound and a distribution image, respectively, to be distributed to the shared server 11. The distribution processing unit 126 adjusts a resolution of each of the acquired distribution sound and the acquired distribution image as needed to be encoded, and performs streaming distribution of the encoded sound data and the encoded image data to one or more of the information processing terminals through the shared server 11. Accordingly, the information processing terminal 12 of the viewing user accesses the shared server 11, so that the game image and sound to be distributed by streaming can be output from the output apparatus 14.

The image sharing system 1 in the embodiment realizes a scheme in which the user A temporarily transfers an operation right of the game (right of controlling the game) to the viewing user. For example, if there is a friend who is good at the soccer game near the user A, when the user A is behind in the soccer game, the user A gives the input apparatus 6 to the friend to let the friend play the game in place of the user A. In the image sharing system 1 in the embodiment, the viewing user is distant from the user A viewing the same game image together, so that the viewing user understands a situation that the user A is in. In view of this, the image sharing system 1 provides a scheme in which the user A transfers the operation right of the game to the viewing user to make a substitutional play temporarily.

When the user A operates the specified input section (SHARE button) provided in the input apparatus 6 during streaming distribution, a plurality of menu items regarding the share play are displayed on the screen. When the user A selects the menu item "TRANSFER OPERATION RIGHT OF GAME PLAY TO VIEWING USER," the participation processing unit 128 notifies the management server 5 and the shared server 11 that the user A is currently accepting a request for participation of the viewing user in the game. In this manner, the viewing user makes a request for a play to the user A, and as a result, an environment in which the viewing user can play the game in place of the user A is prepared.

Next, a scheme in which the viewing user performs a substitutional play will be described.

First, the viewing user operates the input apparatus 6 to activate a viewing application of a live distribution image. The information processing terminal 12 has the same configuration as that of the information processing apparatus 10, and accordingly, the application execution unit 110 executes the viewing application of the live distribution image. When the viewing application is activated, the information processing terminal 12 displays a list of content items which are distributed by streaming in the shared server 11 on the output apparatus 14.

Figure 8:
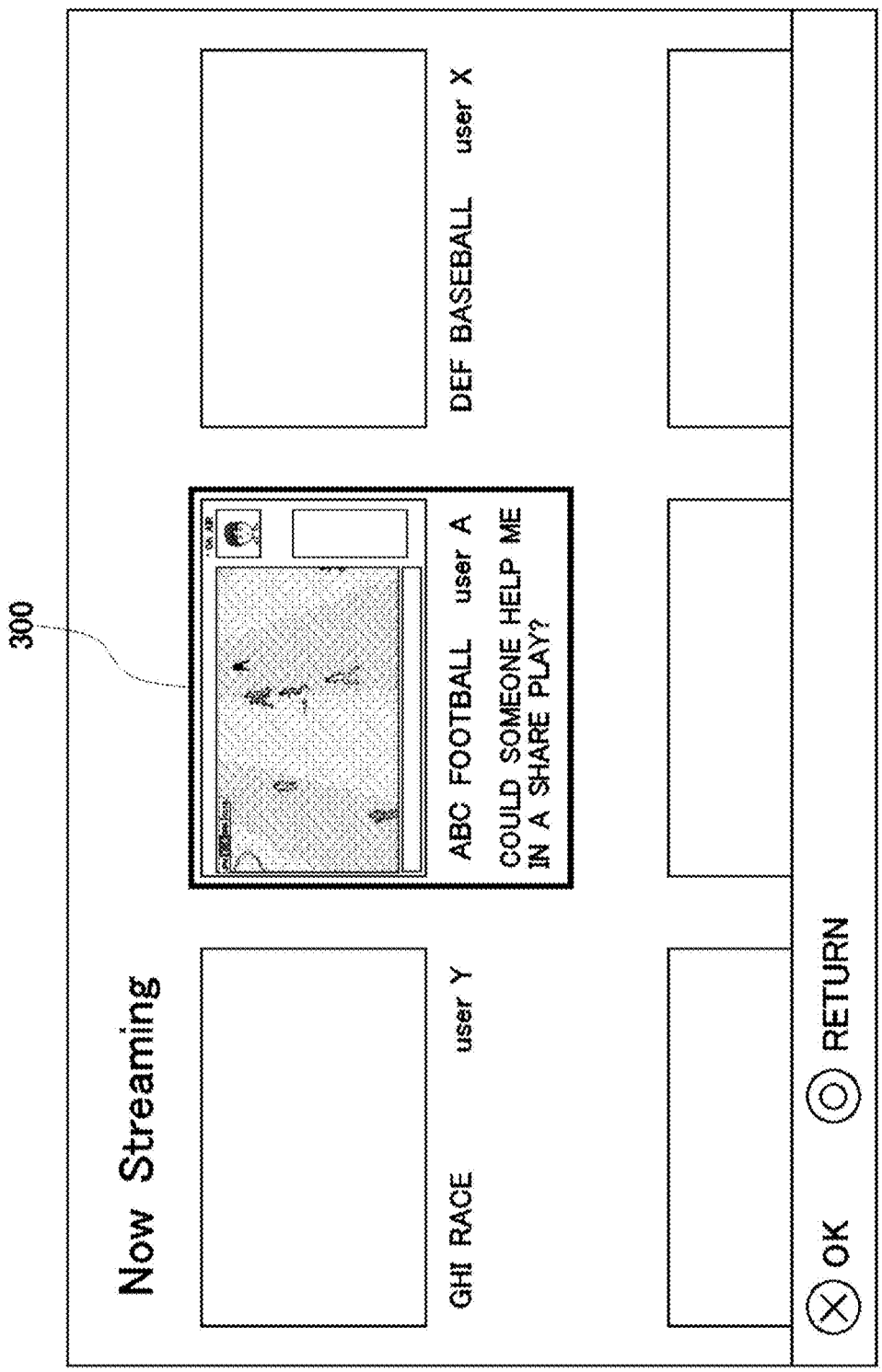
FIG. 8 is a diagram depicting a screen indicating a list of content items to be distributed by streaming.

FIG. 8 is a diagram depicting a screen indicating the list of content items to be distributed by streaming. The management server 5 manages information regarding the content which is distributed in real time in the shared server 11, and the viewing application acquires the information regarding the content from the management server 5 to generate the list of the content items on the screen. The information regarding the content includes a captured image of a game, a game title, information identifying a distributer, and comment data. The user operates the input apparatus 6 to move a selection frame 300 so as to arrange the selection frame 300 on the content information that the user wants to view. In an example of FIG. 8, the selection frame 300 is arranged on the content information regarding the game title "ABC FOOTBALL" which is distributed by the user A.

As depicted in FIG. 8, a comment "COULD YOU SOMEONE HELP ME IN A SHARE PLAY?" from the user A is included in the content information of the user A. This comment is automatically input by the management server 5 when the management server 5 is notified from the information processing terminal 10 that the user A is currently accepting a request for participation of a viewing user in the game. When the viewing user operates ENTER button of the input apparatus 6, the information processing terminal 12 accesses the shared server 11, and streaming image and sound data of the user A is output from the output apparatus 14.

Figure 9:
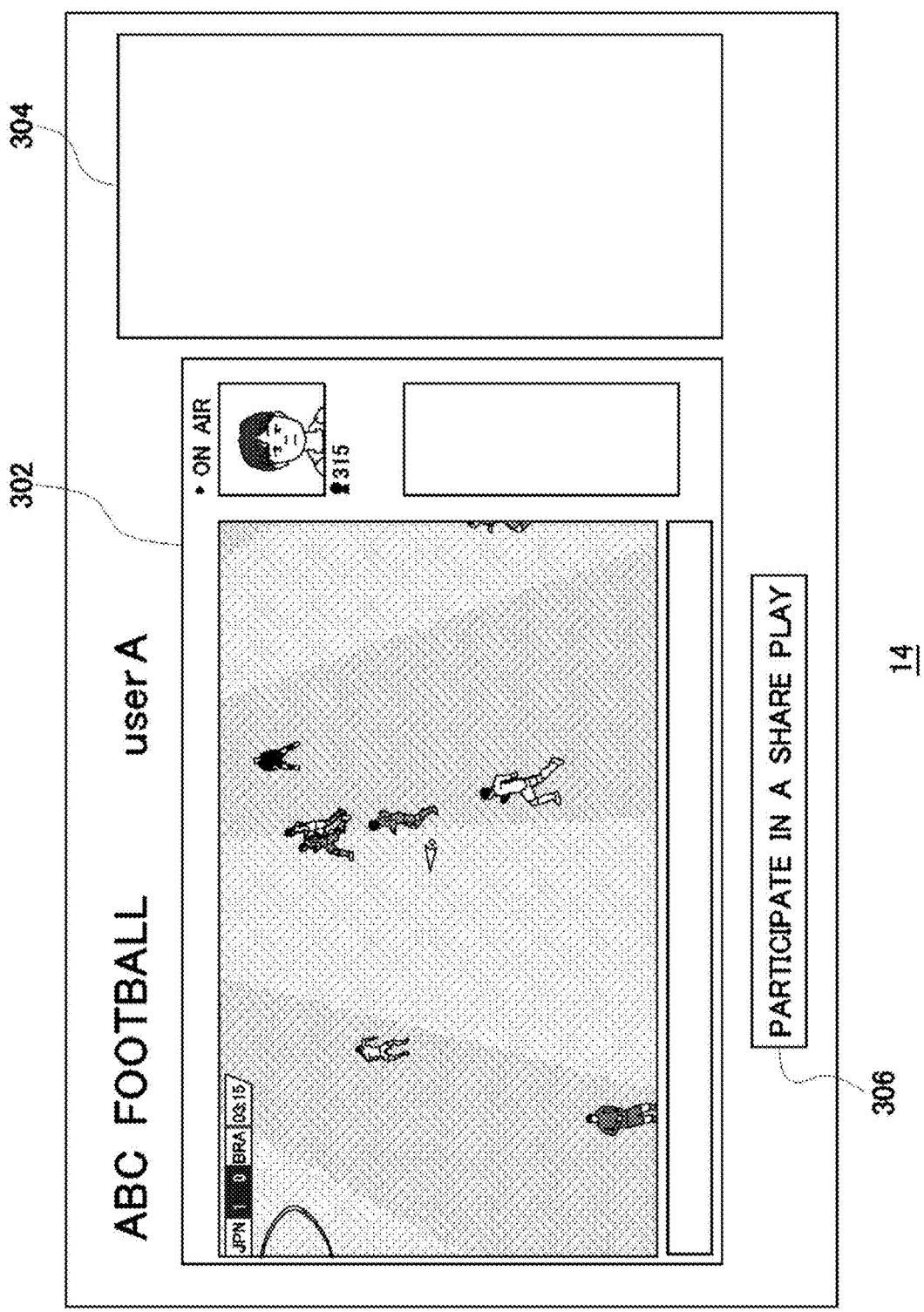
FIG. 9 is a diagram depicting an example of a screen to be displayed on an output apparatus of a viewing user.

FIG. 9 a diagram depicting an example of a screen to be displayed on the output apparatus 14 of the viewing user. The information processing terminal 12 displays the distribution image of the user A in a predetermined screen layout on the output apparatus 14. In the example depicted in FIG. 9, the distribution image to be distributed by streaming from the shared server 11 is displayed in a distribution image display region 302. In this screen layout, a comment display region 304 for displaying a comment may be provided on the right side of the distribution image display region 302. Although the comment display region is also included in the distribution image, comments displayed in both of the comment display regions may be the same or different from each other.

On the lower portion of the distribution image display region 302, provided is a participation button 306 for expressing the viewing user's intention to participate in a share play requested by the user A. The share play to be participated herein is a game play in which the viewing user plays in place of the user A. When the distribution user A approves the participation of the viewing user, the viewing user operates the input apparatus 6 of his/her own in place of the user A to play the game. When the viewing user operates the participation button 306, the operation information is transmitted to the information processing apparatus 10 to the management server 5, as a play request.

When transmitting the play request of the viewing user to the information processing apparatus 10, the management server 5 transmits information indicating the viewing user's skill level regarding the game along with the play request. In the image sharing system 1, the management server 5 manages trophy information earned by accomplishing various missions prepared for the game as information indicating each user's skill level regarding the game. In view of this, the management server 5 transmits the earned trophy information of the viewing user to the information processing apparatus 10 along with the play request. Note that the information regarding a skill level is not only the earned trophy information, but also may be other kind of information.

Referring back to FIG. 3, the accepting unit 104 accepts the play requests of the viewing users who operate the information processing terminals 12 from the management server 5, and feeds the play requests to the sharing processing unit 120. The participation processing unit 128 accepts the play requests of the viewing users and counts the number of the play requests. The participation processing unit 128 sends the counted number of the play requests to the image processing unit 118, and the image processing unit 118 displays the counted number of the play requests on the right side of the viewer number display region 220.

Figure 10:
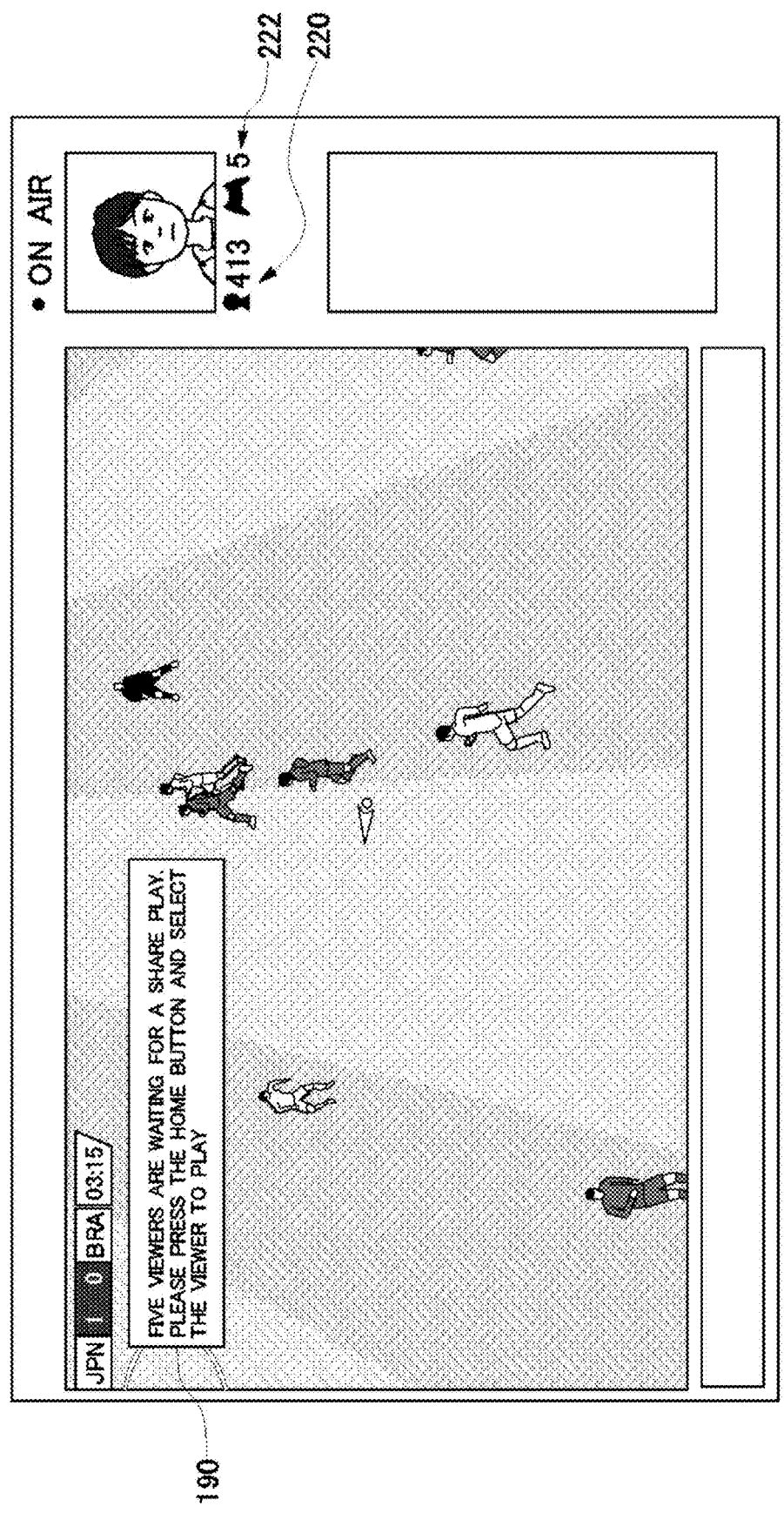
FIG. 10 is a diagram depicting an example of a game screen to be displayed on the output apparatus of the distribution user.

FIG. 10 is a diagram depicting an example of a game screen to be displayed on the output apparatus 4 of the distribution user A. In the example depicted in FIG. 10, the number of the play requests accepted, that is, the number of people waiting for a share play is displayed in a share play waiting number display region 222 on the right side of the viewer number display region 220. In this case, the counted number of viewers is 413, and the counted number of people waiting for a share play is five.

Note that the participation processing unit 128 may periodically provide the number of play requests accepted, that is, the number of people waiting for a share play, to the message generation unit 112. The message generation unit 112 generates a notification message notifying the user A of the number of people waiting for a share play, and the image processing unit 118 displays the generated notification message on the game screen in a superimposed manner in the form of a pop-up window 190. When the user A operates a predetermined button (HOME button) of the input apparatus 6, a system screen for selecting one of the viewing users who has made a request for a share play.

Figure 11:
FIG. 11 is a diagram depicting an example of a viewing user selection screen.

FIG. 11 is a diagram depicting an example of a viewing user selection screen to be displayed on the output apparatus 4 of the distribution user A. The participation processing unit 128 provides the accepted play request to the image processing unit 118. The image processing unit 118 displays a list of the viewing users who have made requests for a play along with the information indicating their skill levels regarding the game. In this case, the number of trophies earned by each of the viewing users in the games of "ABC FOOTBALL" is indicated. On the viewing user selection screen depicted in FIG. 11, the number of earning a platinum trophy, a gold trophy, a silver trophy, and a bronze trophy is indicated from the left in descending order of difficulty. When the distribution user A moves the selection frame 230 onto a frame of a desired viewing user and operates the ENTER button, the participation processing unit 128 approves a game play of the one viewing user in the selection frame 230.

In this example, the selection frame 230 is arranged on a frame of a user B, and with the ENTER button operated by the distribution user A, the participation processing unit 128 approves the game play of the viewing user B in place of the distribution user A. The participation processing unit 128 transmits the approval of the game play to the information processing terminal 12b of the viewing user B selected through the management server 5. On condition that the viewing user B notifies the management server 5 of his/her acceptance of the game play, it is determined that the viewing user B makes a substitutional play. As depicted in FIG. 11, display of the information indicating the skill level of each of the viewing users allows the distribution user A to easily find a viewing user who is well acquainted with "ABC FOOTBALL."

Note that, when the distribution user A moves the selection frame 230 at a position of an automatic selection button 232 and operates the ENTER button, the participation processing unit 128 approves the game play of one viewing user who is selected based on a predetermined criterion. The participation processing unit 128 may approve one viewing user who has the highest skill level or one viewing user who is the first person to express his intention to participate in the game. The participation processing unit 128 automatically selects the viewing user, and as a consequence, the distribution user A can save time and effort to select the viewing user for a substitutional play.

Note that the participation processing unit 128 allows at least one viewing user to play the game but may allow two or more viewing users who play at the same time to play the game, in place of the user A.

After the participation processing unit 128 approves the game play of the viewing user B, the connection control unit 130 makes a P2P (peer-to-peer) connection with the information processing terminal 12b operated by the viewing user B. This P2P connection establishes a bidirectional communication path with low delay and high image quality, compared with connection between the shared server 11 and the information processing terminal 12b. Note that the information processing terminal 12b continues to display the live distribution image from the shared server 11 on the output apparatus 14b until the P2P connection is established, and when the P2P connection is established, the information processing terminal 12b switches the communication path to start to retrieve the game image and sound from the information processing apparatus 10.

The viewing user B operates the input apparatus 6b watching the game image displayed on the output apparatus 14b to play the game. The communication unit 102 of the information processing apparatus 10 receives operation information transmitted from the information processing terminal 12b operated by the viewing user B through the P2P communication path between the information processing apparatus 10 and the information processing terminal 12b, and the application execution unit 110 processes the game using the operation information of the viewing user B. The game image and sound data processed by the application execution unit 110 is transmitted to the information processing terminal 12b through the P2P communication path. In this manner, in the image sharing system 1, an environment in which the viewing user makes a game play in place of the distribution user A is achieved.

Note that the message generation unit 112 may generate a notification message to the user A during distribution of the game image, in some cases. In FIG. 5, the pop-up window 180 which is displayed on the game screen in a superimposed manner is indicated. However, since the pop-up window 180 contains the user name 184 representing a sender of the message, the text of the message 182, and the like, it is not preferable to broadcast contents of the pop-up window 180 in terms of personal information protection.

In view of this, in the embodiment, the setting unit 114 is provided which allows the user A to set whether or not the notification message is included in the distribution image so as to be visually recognizable. Specifically, the setting unit 114 registers the contents which has been set, by the user A, whether or not the notification message is included in the distribution image so as to be visually recognizable, in the auxiliary storage apparatus 2 as setting information. The notification message generated by the message generation unit 112 includes various kinds. Examples of notification contents in the notification message are listed below:

Message received from a friend
Friend request received
Invitation to play a game received from a friend
Friend is in an online
Trophy earned.

The distribution user A may set whether or not the notification message is included in the distribution image so as to be visually recognizable, for each kind of the notification contents. The setting unit 114 notifies the image processing unit 118 of the setting contents set by the user A. Thus, the image processing unit 118 grasps the kind of the notification message which may be included in the distribution image so as to be visually recognizable and the kind of the notification message which may not be included in the distribution image so as to be visually recognizable. When a notification message is generated by the message generation unit 112, the image setting unit 118 generates a distribution image in accordance with the setting contents in the setting unit 114. Specifically, the image processing unit 118 determines whether or not the notification message may be caused to be included in the distribution image so as to be visually recognizable depending on the kind of the notification message generated by the message generation unit 112.

Note that causing the notification message to be included in the distribution image so as to be visually recognizable is to display the pop-up window 190 in a superimposed manner as depicted in FIG. 10, for example. However, there are at least two methods of not causing the notification message to be included in the distribution image so as to be visually recognizable. One method is that the image processing unit 118 does not cause the pop-up window to be superimposed on the distribution image. The other method is that, in a state in which the image processing unit 118 causes the pop-up window to be superimposed on the distribution image, the image processing unit 118 masks (covers) the pop-up window with a black image, for example. The image processing unit 118 executes image processing on whether or not the notification message is caused to be included in the distribution image so as to be visually recognizable, depending on the setting contents set by the setting unit 114.

Note that the message generation unit 112 may generate a different notification message depending on whether or not the distribution image is being distributed. For example, in a case where the user A sets to include the notification message in the distribution image so as to be visually recognizable, including the personal information or the privacy information in the notification message is not preferable. To cope with this, the message generation unit 112 extracts the personal information from the message which is generated at a normal time (a time other than a time of performing streaming distribution) or replaces the message itself with one only with information not causing any problem, so that the notification message to be displayed during streaming distribution is generated.

Figure 12:
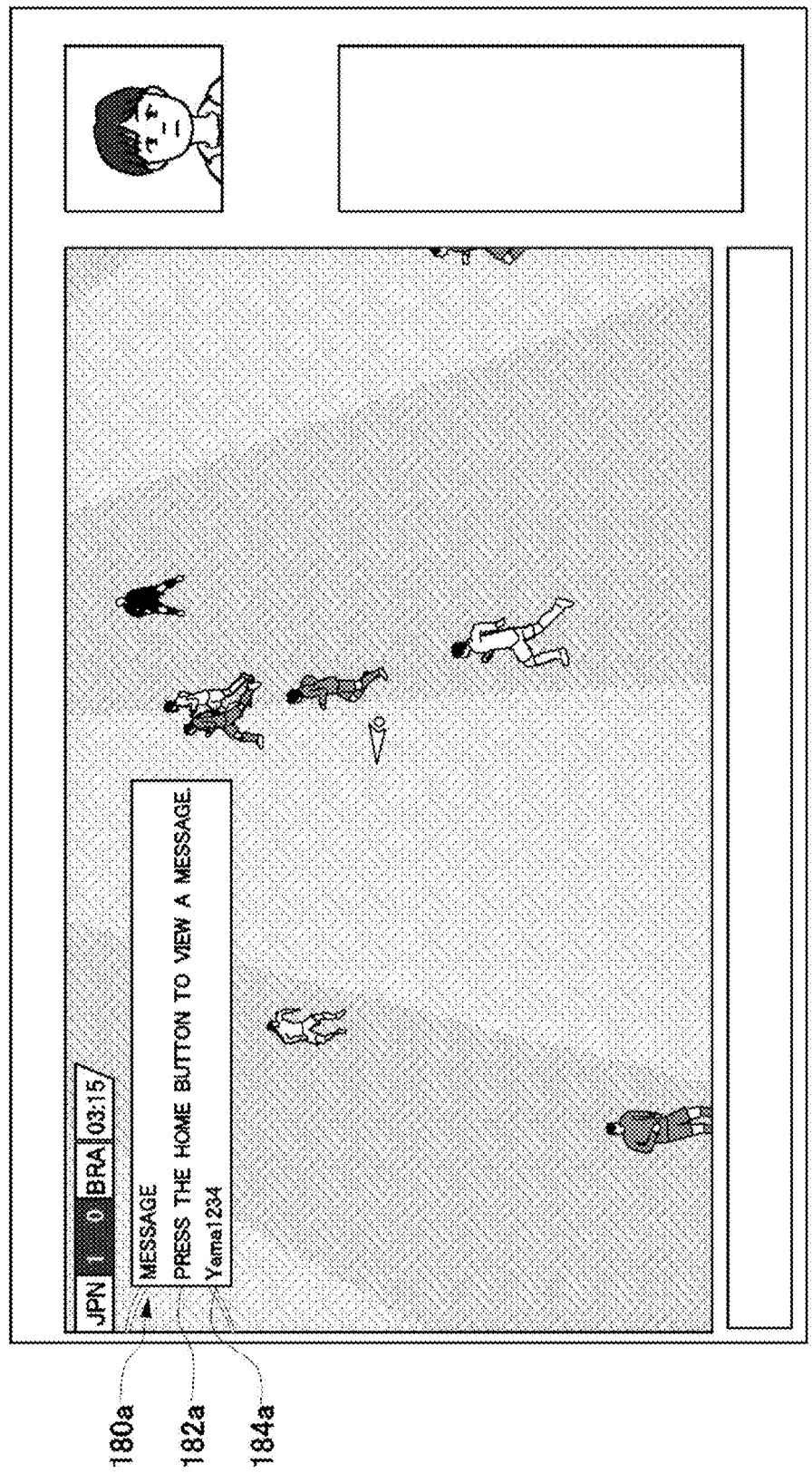
FIG. 12 is a diagram depicting an example of a pop-up window.

FIG. 12 is a diagram depicting an example of a pop-up window which is displayed on a game screen in a superimposed manner. A pop-up window 180a is generated instead of the pop-up window 180 depicted in FIG. 5 since FIG. 12 is a game screen during streaming distribution. A message confirmation method 182a is one replaced with the message text 182, and an online ID (Identification) 184a is different from the user name 184 as a real name and is an identifier which is managed by the management server 5. Thus, during streaming distribution, the message generation unit 112 generates the notification message including no personal information or privacy information, so that the notification message with no problem can be included in the distribution image. Although the amount of information to be obtained decreases, display of the notification message on the game screen realizes the sharing process having enhanced convenience for the distribution user A.

In the foregoing description, the present invention has been described on the basis of the embodiment. This embodiment is merely illustrative, and it is understood for those skilled in the art that combinations of constituting elements and processes of the embodiment can be modified in various ways and that such modifications are also within the scope of the present invention.

REFERENCE SIGNS LIST

1 . . . Image sharing system, 3 . . . Network, 4 . . . Output apparatus, 5 . . . Management server, 10 . . . Information processing apparatus, 11 . . . Shared server, 12b, 12c, 12d . . . Information processing terminal, 14 . . . Output apparatus, 100 . . . Processing unit, 102 . . . Communication unit, 104 . . . Accepting unit, 110 . . . Application execution unit, 112 . . . Message generation unit, 114 . . . Setting unit, 116 . . . Sound provision unit, 118 . . . Image processing unit, 120 . . . Sharing processing unit, 122 . . . Sound acquisition unit, 124 . . . Image acquisition unit, 126 . . . Distribution processing unit, 128 . . . Participation processing unit, 130 . . . Connection control unit, 132 . . . Setting image generation unit.

INDUSTRIAL APPLICABILITY

The present invention can be applied to the technical field regarding distribution of the game image.

The invention claimed is:

1. An information processing apparatus comprising:
an image processing unit configured to generate a display image including a game image;
a distribution processing unit configured to distribute the display image to one or more of information processing terminals through a shared server;
a participation processing unit configured to accept play requests of from viewing users operating the information processing terminals and to approve a game play of one of the viewing users who has made a request for a play,
wherein approval of the request for play allows a viewing user to provide input to the information processing apparatus in place of a user of the information processing apparatus; and
an application execution unit configured to process a game using operation information transmitted from the information processing terminal operated by the viewing user, the game play of which has been approved, wherein
the participation processing unit counts the number of play requests which have been accepted, and
the image processing unit includes the counted number of the play requests in the display image.

2. The information processing apparatus according to claim 1, wherein the image processing unit includes the number of viewing users and the number of play requests side by side in the display image.

3. The information processing apparatus according to claim 1, wherein the image processing unit displays the number of play requests in a pop-up form.

4. The information processing apparatus according to claim 1, further comprising:
a connection control unit configured to establish a peer-to-peer connection between the information processing terminal operated by the corresponding viewing user and the information processing apparatus, after the participation processing unit approves the game play of the corresponding viewing user.

5. The information processing apparatus according to claim 1, wherein the participation processing unit accepts a play request from the information processing terminal through a management server which manages a network service of the information processing apparatus, and transmits the approval of the game play to the information processing terminal through the management server.

6. The information processing apparatus according to claim 5, wherein the participation processing unit accepts information indicating a game skill level of each of the viewing users who have made a request for a play, and
the image processing unit displays a list of the viewing users who each have made a request for a play along with the information indicating the game skill level of each of the viewing users.

7. The information processing apparatus according to claim 1, wherein
when the user performs a predetermined operation while the distribution processing unit distributes the display image through the shared server, the participation processing unit notifies the management server that the user accepts participation of the viewing users in the game.

8. A game image distribution method comprising:
generating a display image including a game image;
distributing the display image to one or more of information processing terminals through a shared server;
accepting play requests of viewing users operating the information processing terminals;
counting the number of play requests which have been accepted;
displaying the counted number of play requests;
approving a game play of one of the viewing users who has made a request for a play,
wherein approval of the request for play allows a viewing user to provide input in place of a user accepting the play requests; and
processing a game using operation information transmitted from the information processing terminal operated by the viewing user the game play of which has been approved.

9. A non-transitory computer readable medium having stored thereon a program for a computer, comprising:
by an image processing unit, generating a display image including a game image, and displaying the counted number of play requests,
by a distribution processing unit, distributing the display image to one or more of information processing terminals through a shared server;
by a participation processing unit, accepting play requests of viewing users operating the information processing terminals, counting the number of play requests which have been accepted, and approving a game play of one of the viewing users who has made a request for a play; and by an application execution unit, processing a game using operation information transmitted from the information processing terminal operated by the viewing user the game play of which has been approved, wherein approval of the request for play allows a viewing user to provide input to the computer in place of a user of the computer.

* * * * *